(12) United States Patent
Miao et al.

(10) Patent No.: US 9,874,699 B2
(45) Date of Patent: Jan. 23, 2018

(54) OPTICAL MODE CONVERSION USING TRANSISTOR OUTLINE (TO) TECHNIQUES AND A BALL LENS

(71) Applicant: Futurewei Technologies, Inc., Plano, TX (US)

(72) Inventors: Rongsheng Miao, San Jose, CA (US); Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/058,753

(22) Filed: Mar. 2, 2016

(65) Prior Publication Data

US 2017/0254959 A1    Sep. 7, 2017

(51) Int. Cl.
| | | |
|---|---|---|
| *G02B 6/32* | (2006.01) |
| *G02B 6/30* | (2006.01) |
| *G02B 6/38* | (2006.01) |
| *G02B 6/42* | (2006.01) |

(52) U.S. Cl.
CPC ............... *G02B 6/32* (2013.01); *G02B 6/30* (2013.01); *G02B 6/3853* (2013.01); *G02B 6/4263* (2013.01)

(58) Field of Classification Search
None
See application file for complete search history.

(56) References Cited

U.S. PATENT DOCUMENTS

| | | | | | |
|---|---|---|---|---|---|
| 5,572,014 | A | * | 11/1996 | Wu | G02B 6/30 250/208.2 |
| 5,631,992 | A | * | 5/1997 | Takahashi | G02B 6/4204 385/93 |
| 6,302,596 | B1 | * | 10/2001 | Cohen | G02B 6/4204 385/88 |
| 6,409,398 | B2 | * | 6/2002 | Nakaya | G02B 6/4204 385/33 |

(Continued)

FOREIGN PATENT DOCUMENTS

| | | |
|---|---|---|
| CN | 201877437 U | 6/2011 |
| CN | 202583529 U | 12/2012 |

(Continued)

OTHER PUBLICATIONS

Cardenas, et al., "HIgh Coupling Efficiency Etched Facet Tapers in Silicon Waveguides," IEEE Photonics Technology Letters, vol. 26, No. 23, Dec. 1, 2014 pp. 2380-2382.

(Continued)

*Primary Examiner* — Chad H Smith
(74) *Attorney, Agent, or Firm* — Conley Rose, P.C.

(57) ABSTRACT

An apparatus comprises a transistor outline (TO) package comprising a TO can holder; and a TO can at least partially embedded within the TO can holder; and a mode converter coupled to the TO package. A system comprises a mode converter comprising a lens configured to convert a mode of a light from a first mode size to a second mode size, wherein the first mode size is smaller than the second mode size; a silicon photonic chip comprising a waveguide configured to communicate the light; a fiber configured to couple to the lens and the waveguide; and a substrate configured to provide a support for the silicon photonic chip.

20 Claims, 16 Drawing Sheets

(56) References Cited

U.S. PATENT DOCUMENTS

| | | | | |
|---|---|---|---|---|
| 6,595,701 | B2 * | 7/2003 | Terada | G02B 6/4225 |
| | | | | 385/90 |
| 6,749,347 | B1 * | 6/2004 | Ichihara | G02B 6/4204 |
| | | | | 385/88 |
| 6,846,113 | B2 * | 1/2005 | Yeh | G02B 6/4238 |
| | | | | 385/88 |
| 7,456,945 | B2 * | 11/2008 | Shih | H01L 31/0203 |
| | | | | 257/E31.117 |
| 2001/0024551 | A1 * | 9/2001 | Yonemura | G02B 6/4246 |
| | | | | 385/88 |
| 2001/0055451 | A1 | 12/2001 | Kuhara et al. | |
| 2003/0197237 | A1 | 10/2003 | Huang | |

FOREIGN PATENT DOCUMENTS

| | | |
|---|---|---|
| KR | 20110066321 A | 6/2011 |
| TW | 531049 U | 5/2003 |

OTHER PUBLICATIONS

Machine Translation and Abstract of Chinese Publication No. CN201877437, dated Jun. 22, 2011, 5 pages.
Machine Translation and Abstract of Chinese Publication No. CN202583529, dated Dec. 5, 2012, 4 pages.
Machine Translation and Abstract of Korean Publication No. KR20110066321, dated Jun. 17, 2011, 9 pages.
Foreign Communication From a Counterpart Application, PCT Application No. PCT/CN2017/073062, English Translation of International Search Report dated Apr. 20, 2017, 5 pages.

* cited by examiner

OPTICAL MODE CONVERSION USING TRANSISTOR OUTLINE (TO) TECHNIQUES AND A BALL LENS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Silicon photonic devices are photonic devices that use silicon (Si) and its derivatives as an optical medium. Silicon photonic devices may be fabricated using existing semiconductor fabrication techniques for electrical devices. Thus, many silicon photonic devices are hybrid devices that have both optical components and electrical components on a single chip. Such a hybrid device may be part of a larger system in package (SIP), which refers to a number of integrated circuits in a single package.

SIPs with silicon photonic components often comprise both a silicon optical waveguide and an optical fiber. The waveguide often comprises both an input port and an output port. The optical fiber is often a single-mode fiber. There is a need to convert an optical mode of the waveguide to an optical mode of the fiber. In this context, an optical mode may refer to a shape of a light beam at the exit or entrance of a waveguide, fiber, or other medium. An optical mode size refers to the physical size of an optical mode. The physical size may be based on optical intensity. For instance, light below a specified threshold intensity may not be considered part of the physical size.

The mode size of the waveguide input port and output port is relatively smaller and typically about 2-4 micrometers (μm). The mode size of the fiber is relatively larger and typically about 8-10 μm. That relative size difference makes it difficult to couple light between the waveguide and the fiber.

SUMMARY

In one embodiment, the disclosure includes an apparatus comprising: a transistor outline (TO) package comprising: a TO can holder; and a TO can at least partially embedded within the TO can holder; and a mode converter coupled to the TO package. In some embodiments, the mode converter is a ball lens; the ball lens comprises N-BK7 glass or sapphire glass; the ball lens is bonded to a top of the TO can with glass frit; the apparatus further comprises a receptacle holder bonded to the TO can holder; and a fiber receptacle at least partially embedded within the receptacle holder; the receptacle holder comprises stainless steel, and wherein the fiber receptacle comprises a stainless steel exterior and an interior comprising a zirconia ferrule enveloping a large-mode fiber; receptacle holder is laser welded to the TO can holder, and wherein the fiber receptacle is bonded to the receptacle holder; the apparatus further comprises a fiber pigtail holder bonded to the TO can holder; and a fiber pigtail at least partially embedded within the fiber pigtail holder; the fiber pigtail holder comprises stainless steel, and wherein the fiber pigtail comprises a stainless steel exterior and an interior comprising a zirconia ferrule and a large-mode fiber; the fiber pigtail holder is laser welded to the TO can holder, and wherein the fiber pigtail is laser welded to the fiber pigtail holder; the apparatus further comprises a ferrule holder bonded to the TO can holder; a ferrule at least partially embedded within the ferrule holder; and a small-mode fiber at least partially embedded within the ferrule; the ferrule holder comprises Kovar or stainless steel, wherein the ferrule comprises a zirconia exterior, and wherein the small-mode fiber comprises a core and a cladding; the ferrule holder is laser welded or resistance welded to the TO can holder, and wherein the ferrule is bonded to the ferrule holder; the mode converter is an aspherical lens.

In another embodiment, the disclosure includes a system comprising: a mode converter comprising a lens configured to convert a mode of a light from a first mode size to a second mode size, wherein the first mode size is smaller than the second mode size; a silicon photonic chip comprising a waveguide configured to communicate the light; a fiber configured to couple to the lens and the waveguide; and a substrate configured to provide a support for the silicon photonic chip. In some embodiments, the lens is either a ball lens or an aspherical lens, and wherein the lens is further configured to convert the mode from the second mode size to the first mode size; the silicon photonic chip further comprises a waveguide port and a V-groove, and wherein the fiber is further configured to further couple to the waveguide via the waveguide port and the V-groove; the silicon photonic chip further comprises a fiber housing, and wherein the fiber is further configured to bond in the fiber housing and optically couple to the waveguide via butt coupling; the mode converter, the silicon photonic chip, and the substrate make up a non-hermetic package.

In yet another embodiment, the disclosure includes a method comprising: receiving, from a first fiber, a light comprising a mode of a first size; passing the light from the first fiber to a ball lens optically coupled to the first fiber; converting, using the ball lens, the mode from the first size to a second size; passing the light through a transistor outline (TO) package enveloping the ball lens; and transmitting the light to a second fiber optically coupled to the ball lens.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
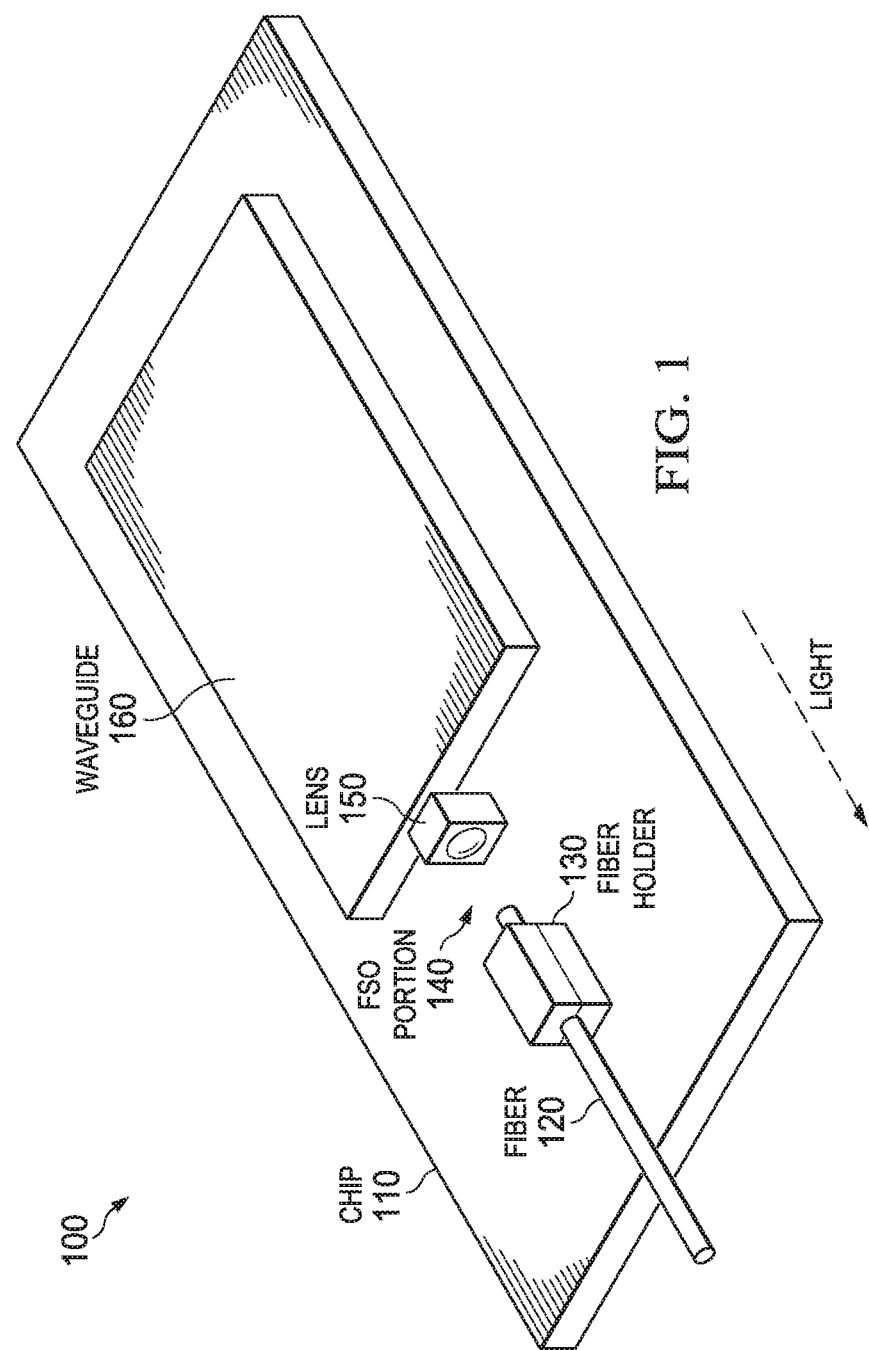
FIG. 1 is a schematic diagram of a SIP employing free-space optics (FSO).

FIG. 1 is a schematic diagram of a SIP 100 employing free-space optics (FSO). The SIP 100 comprises a chip 110, a fiber 120, a fiber holder 130, a FSO portion 140, a lens 150, and a waveguide 160. The chip 110 provides supports the fiber holder 130, the lens 150, and the waveguide 160. The fiber holder 130 holds the fiber 120. The waveguide 160 comprises silicon. In operation, a light enters the waveguide 160 at some point, travels from the waveguide 160 to the lens 150, exits the lens 150 at a first edge of the FSO portion 140, travels in air across the FSO portion 140, converts to a larger mode across the FSO portion 140, and couples to the fiber 120 at a second edge of the FSO portion 140. The figures show a direction of light from a waveguide to a fiber as an example, but it is understood that light may travel bi-directionally, meaning both in the direction shown and in the opposite direction.

Figure 2:
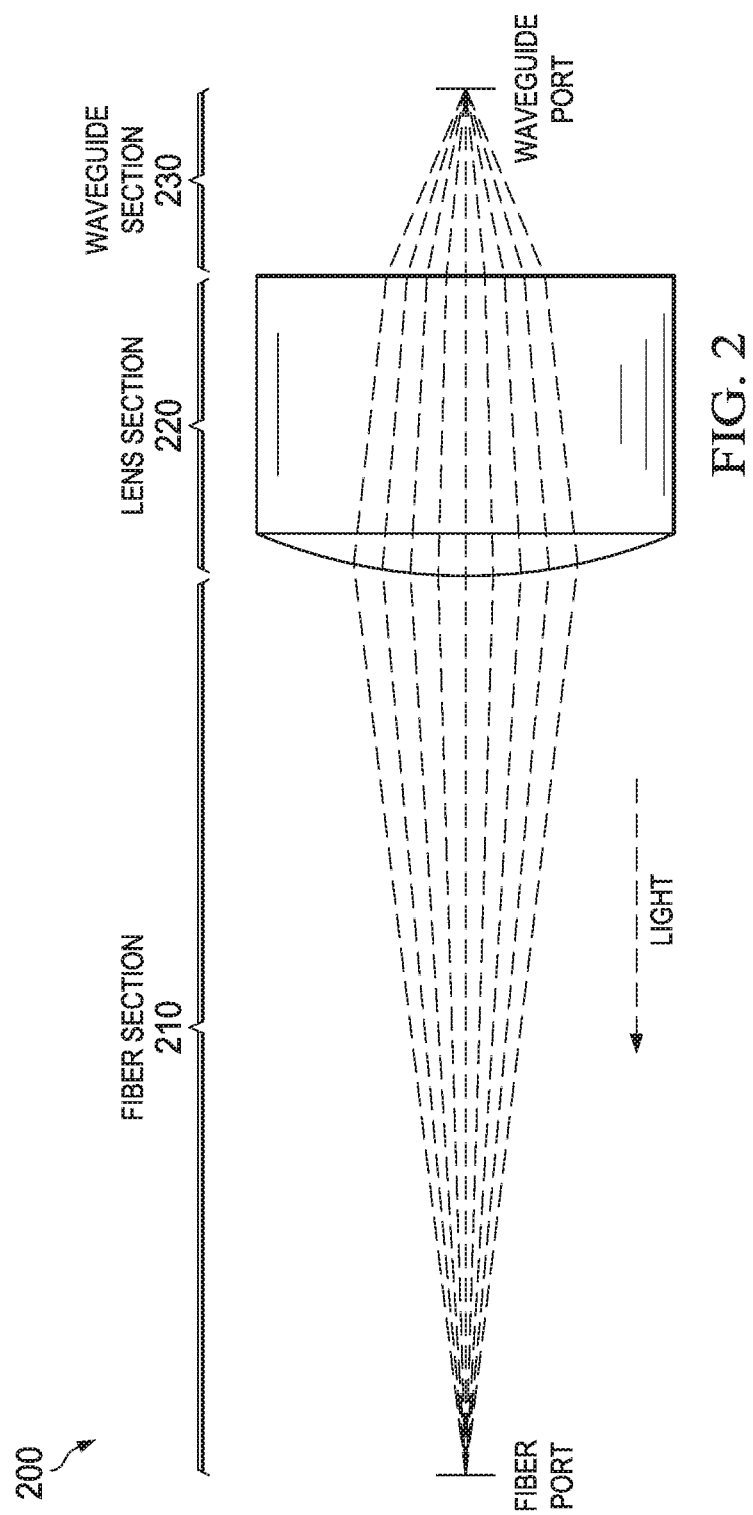
FIG. 2 is an optical diagram of light coupling between the fiber and the waveguide in the SIP in FIG. 1.

FIG. 2 is an optical diagram 200 of light coupling between the fiber 120 and the waveguide 160 in the SIP 100 in FIG. 1. The diagram 200 comprises a fiber section 210 and a fiber port corresponding to the fiber 120, a lens section 220 corresponding to the lens 150, and a waveguide section 230 and a waveguide port corresponding to the waveguide 160. As can be seen, the fiber section 210 is relatively longer than the waveguide section 230 because the mode of the fiber 120 is larger than the mode of the waveguide 160.

Returning to FIG. 1, as light travels across the FSO portion 140, the light is exposed to air. This may not be an issue when the SIP 100 is hermetically sealed. In this context, hermetically sealed means that the SIP 100 is part of a package that is airtight and thus excludes the passage of external elements such as moisture. However, when the SIP 100 is not hermetically sealed, external elements such as moisture may interfere with light traveling across the FSO portion 140. Thus, the SIP 100 may be suitable only for hermetically-sealed applications.

Figure 3:
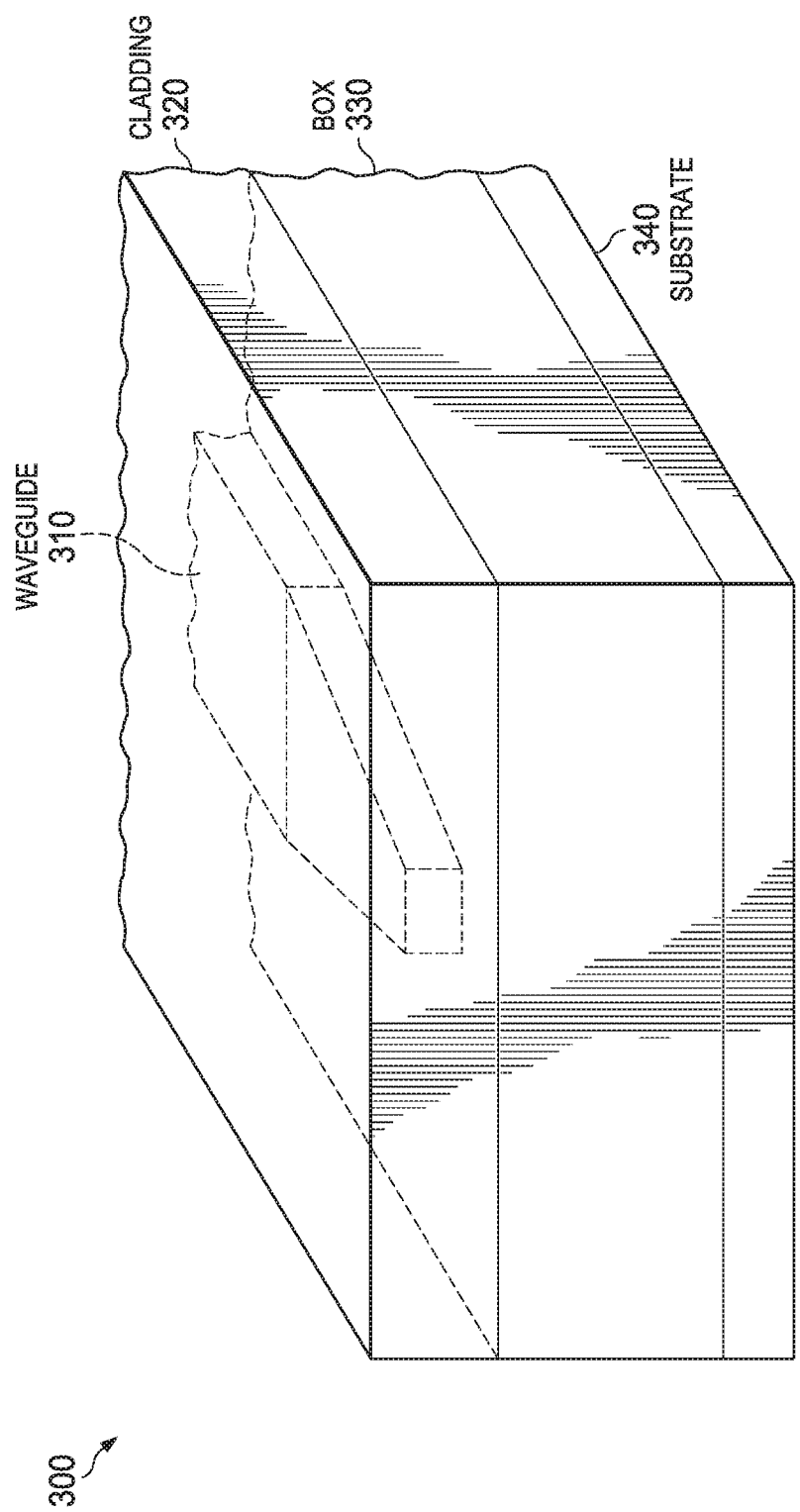
FIG. 3 is a schematic diagram of a mode converter employing an inverse taper.

FIG. 3 is a schematic diagram of a mode converter 300 employing an inverse taper. The mode converter 300 comprises a waveguide 310, a cladding 320, a buried oxide (BOX) 330, and a substrate 340. The waveguide 310 comprises silicon (Si), the cladding 320 comprises silicon dioxide ($SiO_2$), and the substrate 340 comprises silicon. As can be seen, the waveguide 310 is relatively wider towards the back of the mode converter 300, but narrows in an inverse tapering manner towards the front of the mode converter 300. In operation, a light enters the waveguide 310 at some point, converts to a larger mode at the front of the waveguide 310 in order to match a mode size of a fiber, exits the waveguide 310 towards the front of the mode converter 300, and enters the fiber. Thus, while the SIP 100 employs FSO for mode conversion, the mode converter 300 employs inverse tapering for mode conversion.

However, current materials and fabrication techniques limit the inverse taper of the waveguide 310. For instance, the mode of the waveguide 310 may reach only 4 μm at its exit. That size makes it difficult to couple light to an 8-10 μm mode fiber. Insufficient mode conversion may cause a loss of light, which degrades light signal detection or requires increased light transmission power.

There is therefore a need for a mode converter that comprises a closed optical path and thus need not be hermetically sealed. A closed optical path, or a gapless optical path, is an optical path that is not exposed to external elements. There is also a need for a mode converter that substantially or completely converts a mode of a light from a waveguide to a fiber and vice versa.

Disclosed herein are embodiments for mode converters with closed optical paths and improved mode conversion. The mode converters comprise transistor outline (TO) packages that reduce cost. The TO packages do not require adhesives and therefore may be used in non-hermetic packaging. The mode converters further comprise ball lenses that couple fibers. The ball lenses provide closed optical paths that allow for non-hermetic packaging. In addition, the ball lenses substantially or completely convert modes of lights from the waveguides to the fibers.

Figure 4:
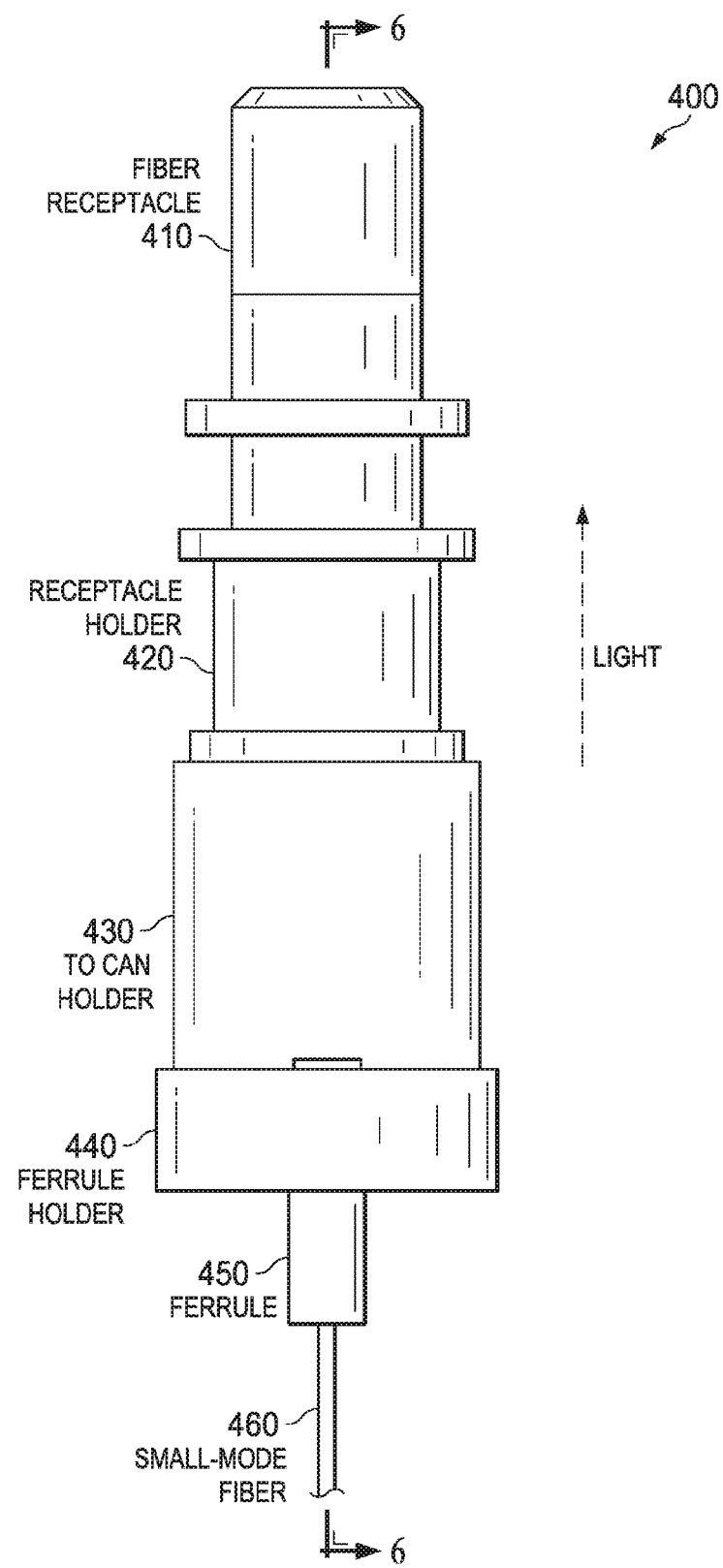
FIG. 4 is a side view of a mode converter according to an embodiment of the disclosure.
Figure 5:
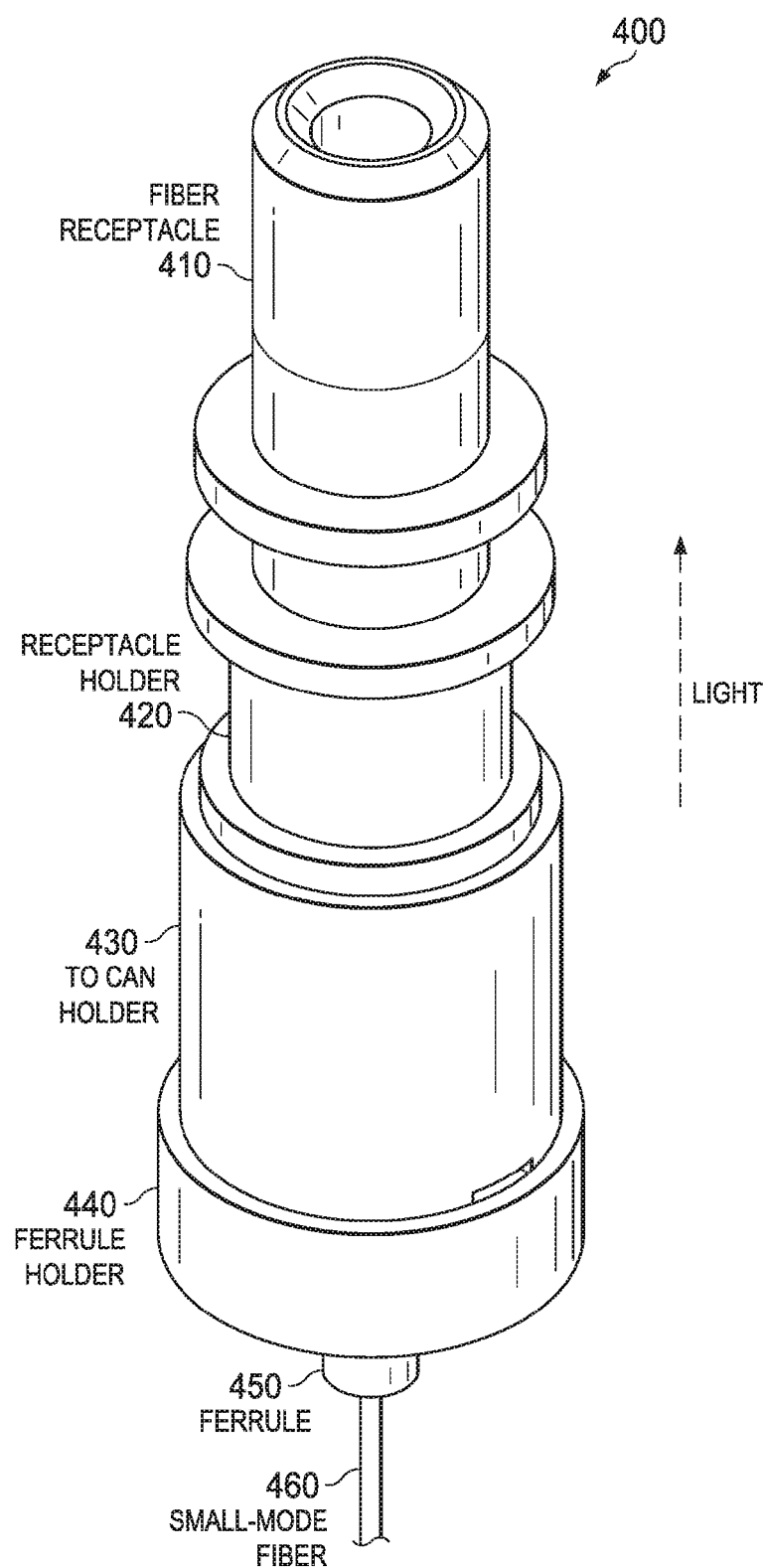
FIG. 5 is a perspective view of the mode converter in FIG. 4.

FIG. 4 is a side view of a mode converter 400 according to an embodiment of the disclosure. The mode converter 400 comprises a fiber receptacle 410, a receptacle holder 420, a TO can holder 430, a ferrule holder 440, a ferrule 450, and a small-mode fiber 460. FIG. 5 is a perspective view of the mode converter 400 in FIG. 4. FIG. 5 shows the same components of the mode converter 400 as FIG. 4. Those components are described more fully below with respect to FIG. 6.

Figure 6:
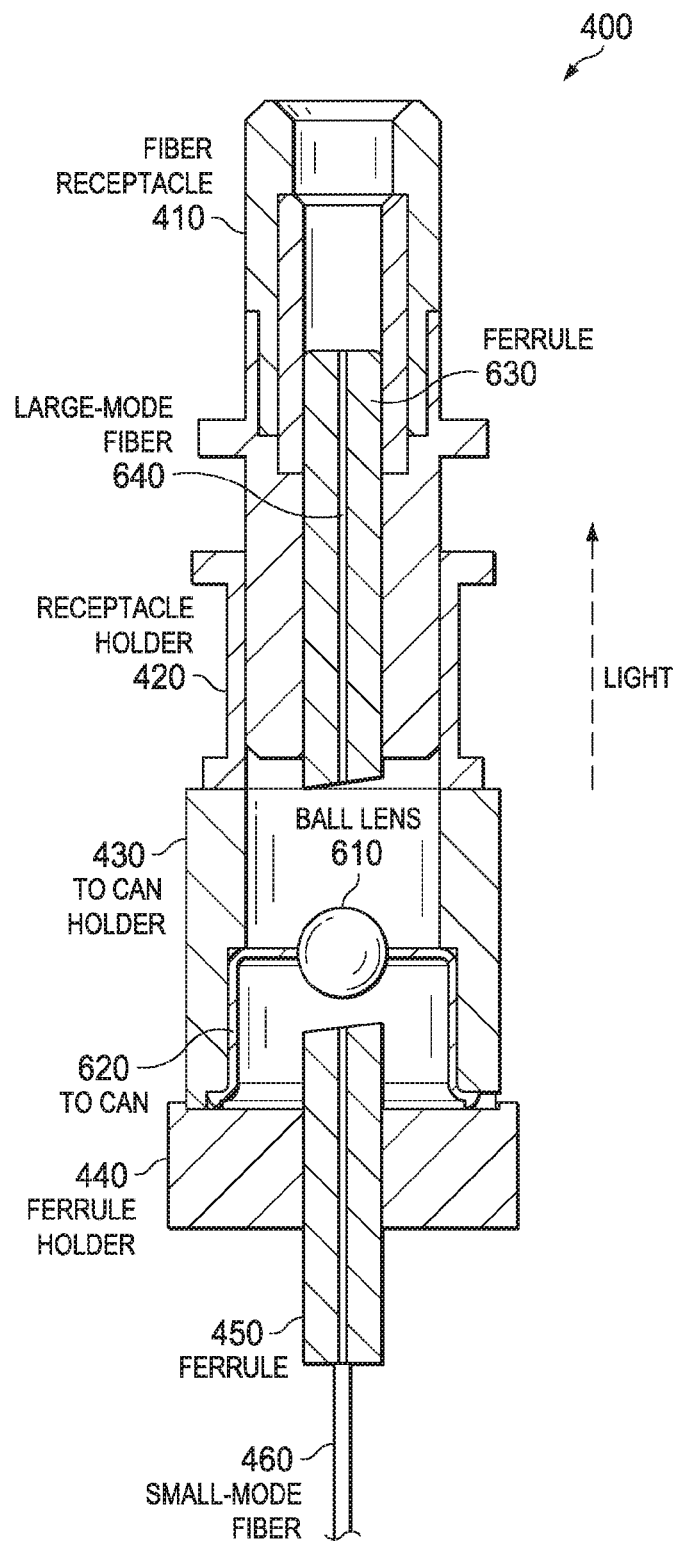
FIG. 6 is a side cross-sectional view of the mode converter in FIG. 4 according to an embodiment of the disclosure.

FIG. 6 is a side cross-sectional view of the mode converter 400 in FIG. 4 according to an embodiment of the disclosure. The cross-sectional view in FIG. 6 is taken along the 6-6 cut line in FIG. 4. FIG. 6 shows the same components as FIGS. 4 and 5. In addition, FIG. 6 shows that the mode converter 400 comprises a ball lens 610 and a TO can 620.

The fiber receptacle 410 comprises a stainless steel exterior and an interior comprising a ferrule 630 and a large-mode fiber 640. The fiber receptacle 410 is bonded to the receptacle holder 420. The ferrule 630 comprises zirconia and encloses the large-mode fiber 640. The mode of the large-mode fiber 640 is about 8-10 μm in diameter. The fiber receptacle 410 accepts an external large-mode fiber. For instance, a fiber that has a mode of about 8-10 μm in diameter may plug into the receptacle 410 using an ST connector, an FC connector, an LC connector, an SC connector, or another suitable connector. Thus, the large-mode fiber 640 and the external large-mode fiber have modes that match or substantially match. Light may pass from the large-mode fiber 640 to the external large-mode fiber using butt coupling. The external large-mode fiber is not shown as it is may not be a part of the mode converter 400, but may instead be a separate component.

The receptacle holder 420 comprises stainless steel. The receptacle holder 420 is laser welded to the TO can holder 430. The receptacle holder 420 provides a support for the fiber receptacle 410.

The TO can holder 430 comprises stainless steel. The TO can holder 430 provides a support for the TO can 620. The TO can 620 comprises an alloy that has the same or similar temperature expansion as the ball lens 610. For instance, the alloy is Kovar® or stainless steel. The TO can 620 is bonded into place in the TO can holder 430.

The ball lens 610 is spherical or substantially spherical and comprises N-BK7 glass, sapphire glass, or another suitable glass. The ball lens 610 may have a diameter between about 1 millimeter (mm) and about 2 mm, an index of refraction between about 1.7 and about 1.9, and an effective focal length of about 0.3 mm to about 3 mm. Alternatively, the ball lens 610 is aspherical. The ball lens 610 is bonded to a top of the TO can 620 using a glass frit. The glass frit is suitable for use in both hermetic packaging and non-hermetic packaging. The ball lens 610 provides a mode conversion from the small-mode fiber 460, which has a relatively smaller mode size compared to the large-mode fiber 640, to the large-mode fiber 640, which has a relatively larger mode size compared to the small-mode fiber 460 and which connects to the fiber receptacle 410. The ball lens 610 may therefore itself be referred to as a mode converter. In that case, the mode converter 400 may be referred to as a mode converter assembly or mode converter package.

There is an air gap between the small-mode fiber 460 and the ball lens 610 and between the ball lens 610 and the large-mode fiber 640. However, the mode converter 400 encloses those air gaps. Thus, the TO can 620 provides a closed optical path.

Figure 7:
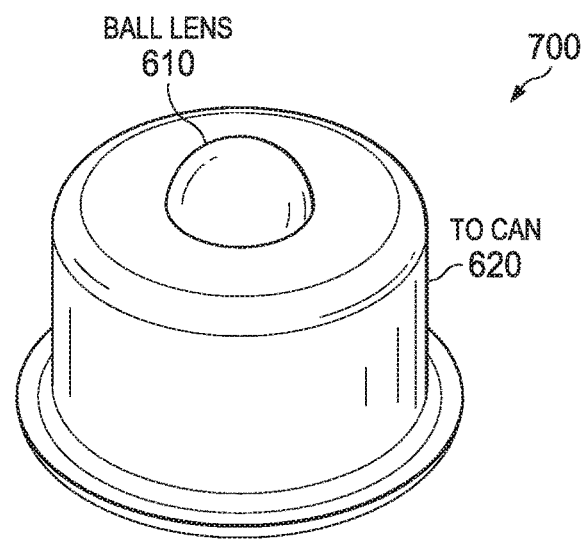
FIG. 7 is a perspective view of the ball lens and the TO can in FIG. 6 according to an embodiment of the disclosure.

FIG. 7 is a perspective view 700 of the ball lens 610 and the TO can 620 in FIG. 6 according to an embodiment of the disclosure. FIG. 7 shows the ball lens 610 and the TO can 620 in isolation from the mode converter 400. In addition, FIG. 7 shows that, from the outside of the TO can 620, only a half or a portion of the ball lens 610 is visible and a remaining half or a remaining portion of the ball lens 610 is enclosed in the TO can 620.

Returning to FIG. 6, the ferrule holder 440 comprises Kovar® or stainless steel. The ferrule holder 440 is laser welded or resistance welded to the TO can holder 430. The ferrule holder 440 provides a support for the ferrule 450.

The ferrule 450 comprises a zirconia exterior and an interior that is a portion of the small-mode fiber 460. Both tips of the ferrule 450 may be polished at an angle to reduce light reflection at the surfaces of the ferrule 450. The angle may be 4-8 degrees (°). The ferrule 450 is bonded into place in the ferrule holder 440. Alternatively, the ferrule 450 is fixed in the ferrule holder 440 using a mechanical press fit.

The small-mode fiber 460 comprises a core for communicating light and a cladding for protecting the core. The core may be about 2-4 μm in diameter. The small-mode fiber 460 is embedded in the ferrule 450. In operation, a light travels through the small-mode fiber 460, travels through the ball lens 610, converts to a larger mode via the ball lens 610, passes through the large-mode fiber 640, and exits out the mode converter 400 into the external large-mode fiber plugged into the fiber receptacle 410.

Figure 8:
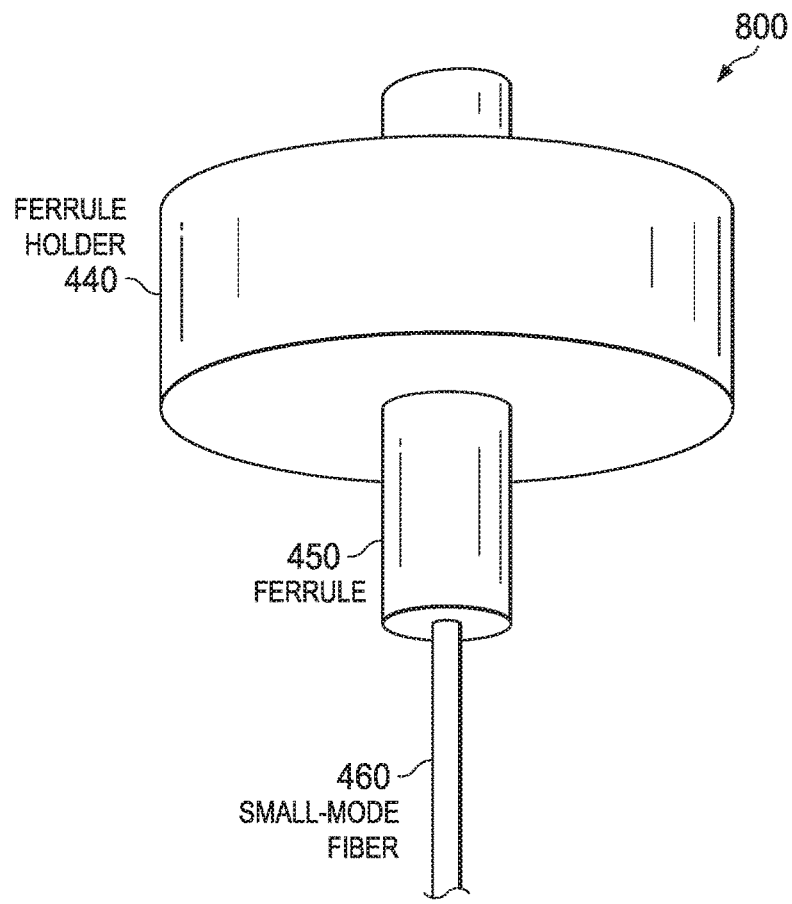
FIG. 8 is a perspective view of the ferrule holder, the ferrule, and the small fiber in FIG. 6 according to an embodiment of the disclosure.

FIG. 8 is a perspective view 800 of the ferrule holder 440, the ferrule 450, and the small-mode fiber 460 in FIG. 6 according to an embodiment of the disclosure. FIG. 8 shows the ferrule holder 440, the ferrule 450, and the small-mode fiber 460 in isolation from the mode converter 400. In addition, FIG. 8 shows that, where the ferrule 450 and the small-mode fiber 460 overlap, the ferrule 450 completely envelops the small-mode fiber 460. Similarly, where the ferrule holder 440 and the ferrule 450 overlap, the ferrule holder 440 completely envelops the ferrule 450.

Returning to FIG. 6, the fiber receptacle 410, the receptacle holder 420, the TO can holder 430, and the TO can 620 may together be referred to as a TO package or a part of a TO package. Alternatively, the TO can holder 430 and the TO can 620 may together be referred to as a TO package or a part of a TO package.

The TO package provides a base for the mode converter 400 to be built around or in. The TO package may be fabricated using simplified techniques that do not require complicated tooling, do not require complicated equipment, provide easy assembly, and provide a high yield, thus providing for reduced costs. Furthermore, the TO package may not require adhesives and may therefore be particularly amenable to non-hermetic packaging. In some TO packages, metal pins exist in place of the small-mode fiber 460, and those metal pins communicate electrical signals. However, as shown in FIG. 6, the small-mode fiber 460 exists and communicates light signals, and there are no metal pins.

Figure 9:
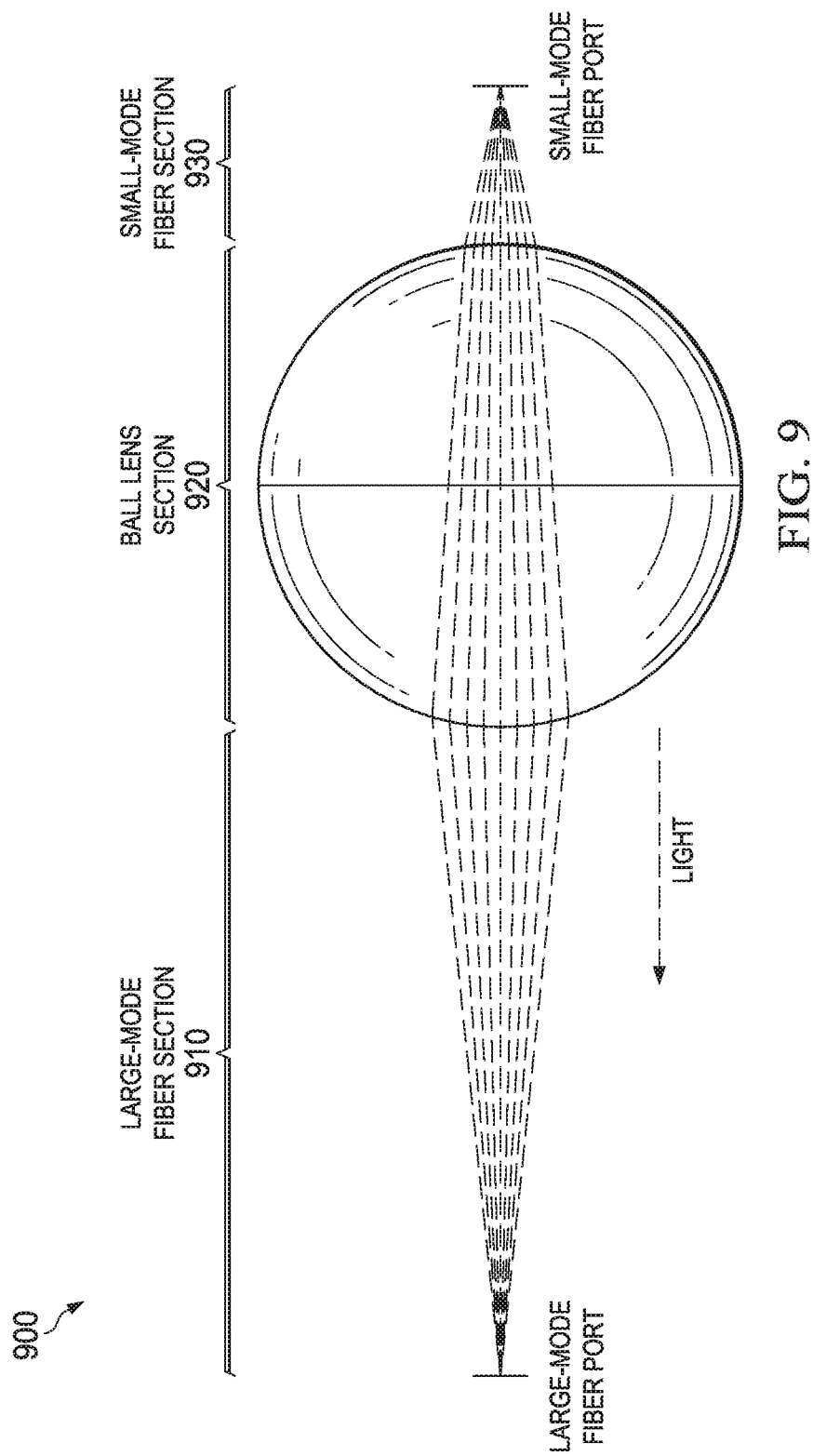
FIG. 9 is optical diagram of light coupling in the mode converter of FIG. 6 according to an embodiment of the disclosure.

FIG. 9 is an optical diagram 900 of light coupling in the mode converter 400 of FIG. 6 according to an embodiment of the disclosure. The diagram 900 shows a large-mode fiber section 910 and a large-mode fiber port corresponding to the large-mode fiber 640, a ball lens section 920 corresponding to the ball lens 610, and a small-mode fiber section 930 and a small-mode fiber port corresponding to the small-mode fiber 460. As can be seen, the large-mode fiber section 910 is relatively longer than the small-mode fiber 930. Thus, in order to couple light traveling from right to left, in other words, from the small-mode fiber section 930 to the large-mode fiber section 910, the ball lens section 920 extends in a direction from right to left.

Figure 10:
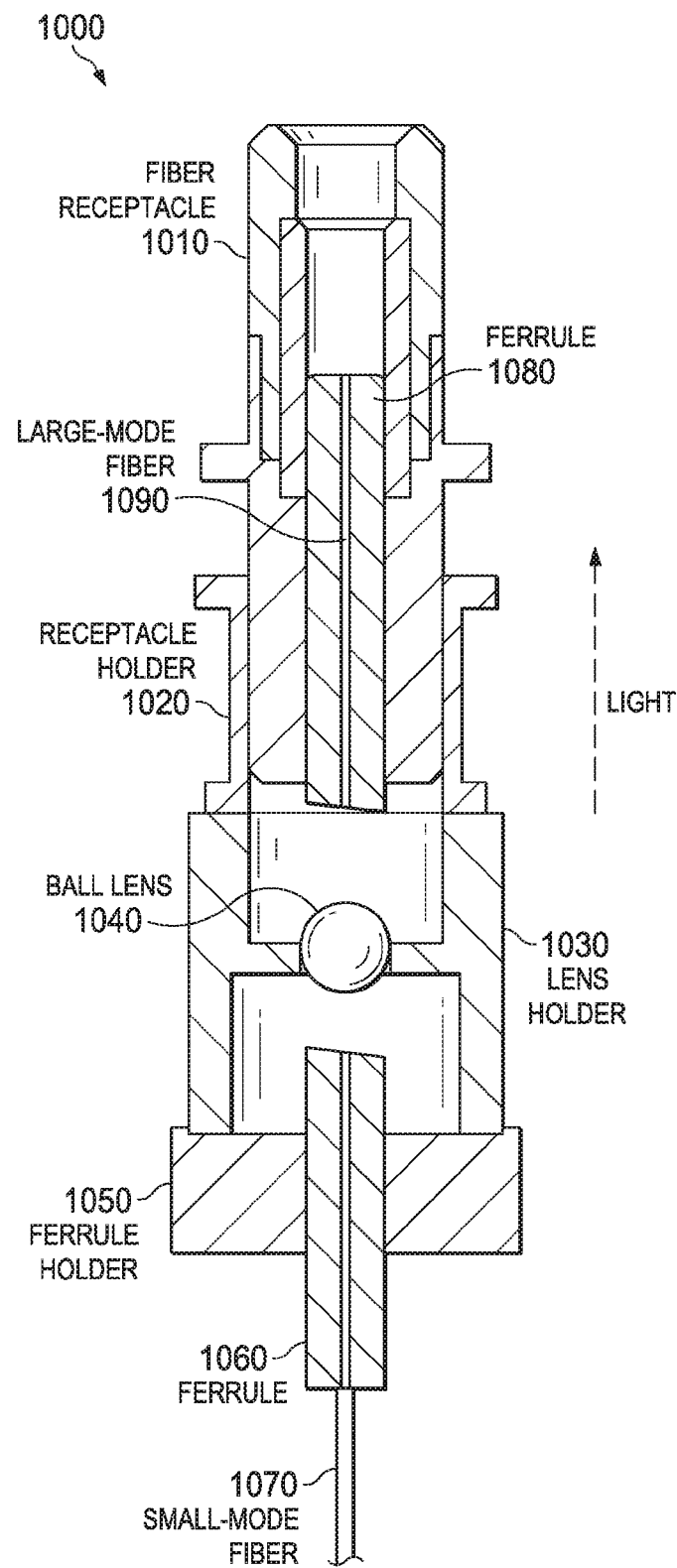
FIG. 10 is a side cross-sectional view of a mode converter according to another embodiment of the disclosure.

FIG. 10 is a side cross-sectional view of a mode converter 1000 according to another embodiment of the disclosure. The mode converter 1000 is similar to the mode converter 400. Specifically, the mode converter 1000 comprises a fiber receptacle 1010, a receptacle holder 1020, a ball lens 1040, a ferrule holder 1050, a ferrule 1060, a small-mode fiber 1070, a ferrule 1080, and a large-mode fiber 1090. However, in place of the TO can holder 430 and the TO can 620 in the mode converter 400, the mode converter 1000 comprises a lens holder 1030.

The lens holder 1030 comprises an alloy that has the same or similar temperature expansion as the ball lens 1040. For instance, the alloy is Kovar® or stainless steel. The lens holder 1030 may be fabricated using techniques that reduce fabrication costs. The ball lens 1040 is bonded inside the lens holder 1030 using a glass frit. The glass frit is suitable for use in both hermetic packaging and non-hermetic packaging.

Figure 11:
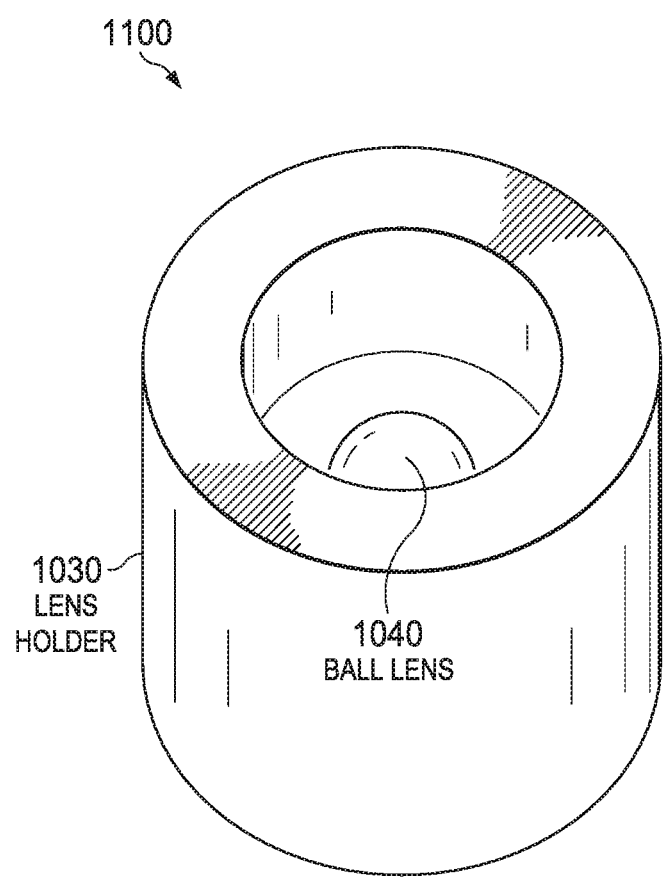
FIG. 11 is a perspective view of the lens holder and the ball lens in FIG. 10 according to an embodiment of the disclosure.

FIG. 11 is a perspective view 1100 of the lens holder 1030 and the ball lens 1040 in FIG. 10 according to an embodiment of the disclosure. FIG. 11 shows the lens holder 1030 and the ball lens 1040 in isolation from the mode converter 1000. In addition, FIG. 11 shows that the lens holder 1030 completely envelops the ball lens 1040.

Figure 12:
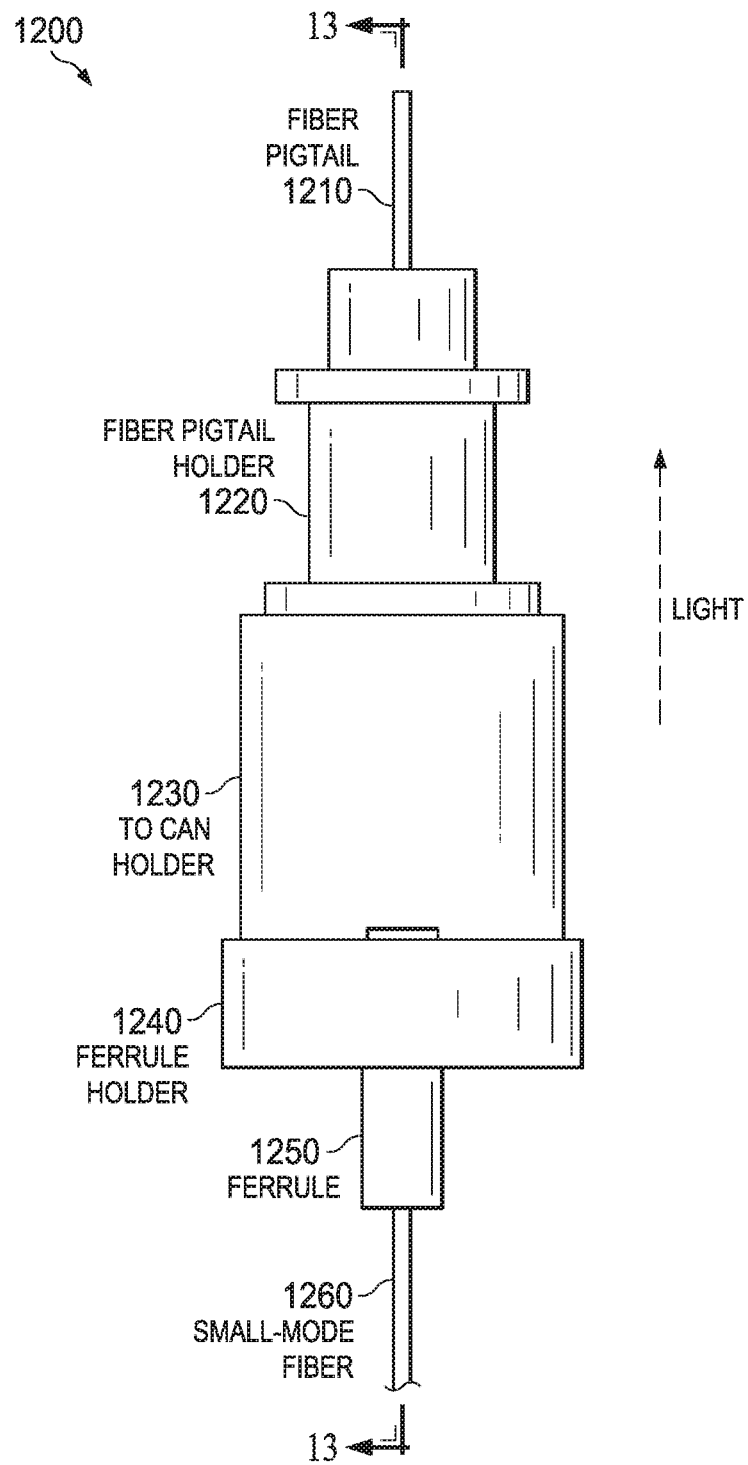
FIG. 12 is a side view of a mode converter according to yet another embodiment of the disclosure.

FIG. 12 is a side view of a mode converter 1200 according to yet another embodiment of the disclosure. The mode converter 1200 is similar to the mode converter 400. Specifically, the mode converter 1200 comprises a TO can holder 1230, a ferrule holder 1240, a ferrule 1250, and a small-mode fiber 1260. However, in place of the fiber receptacle 410 and the receptacle holder 420, the mode converter 1200 comprises a fiber pigtail 1210 and a fiber pigtail holder 1220, respectively.

Figure 13:
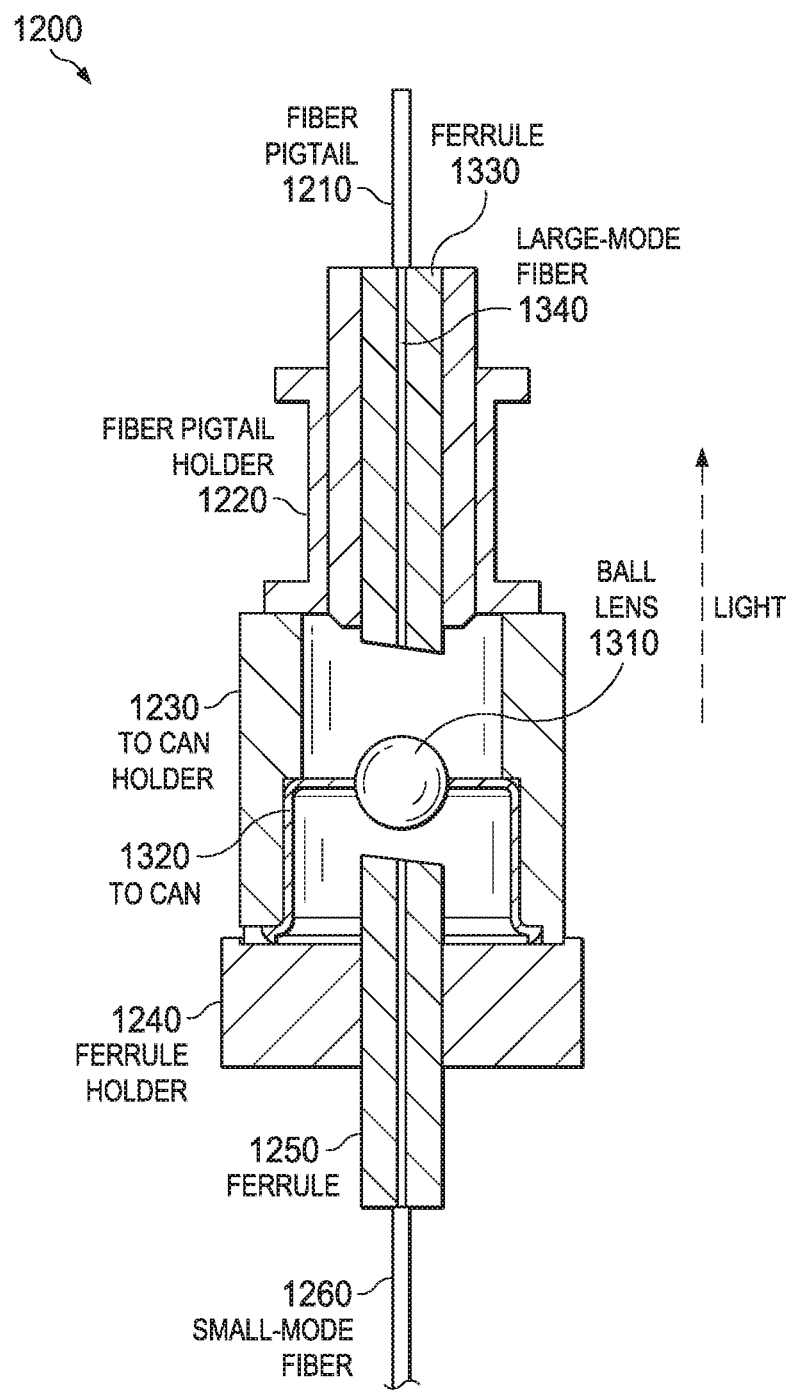
FIG. 13 is a side cross-sectional view of the mode converter in FIG. 12 according to an embodiment of the disclosure.

FIG. 13 is a side cross-sectional view of the mode converter 1200 in FIG. 12 according to an embodiment of the disclosure. The cross-sectional view in FIG. 13 is taken along the 13-13 cut line in FIG. 12. FIG. 13 shows the same components as FIG. 12. In addition, FIG. 13 shows that the mode converter 1200 comprises a ball lens 1310, a TO can 1320, a ferrule 1330, and a large-mode fiber 1340.

The fiber pigtail 1210 comprises a stainless steel exterior and an interior comprising the ferrule 1330 and the large-mode fiber 1340. The fiber pigtail 1210 is bonded to the fiber pigtail holder 1220 using laser welding. The ferrule 1330 comprises zirconia and encloses the large-mode fiber 1340.

The fiber pigtail holder 1220 comprises stainless steel. The fiber pigtail holder 1220 is laser welded to the TO can holder 1230. The fiber pigtail holder 1220 provides a support for the fiber pigtail 1210.

Figure 14:
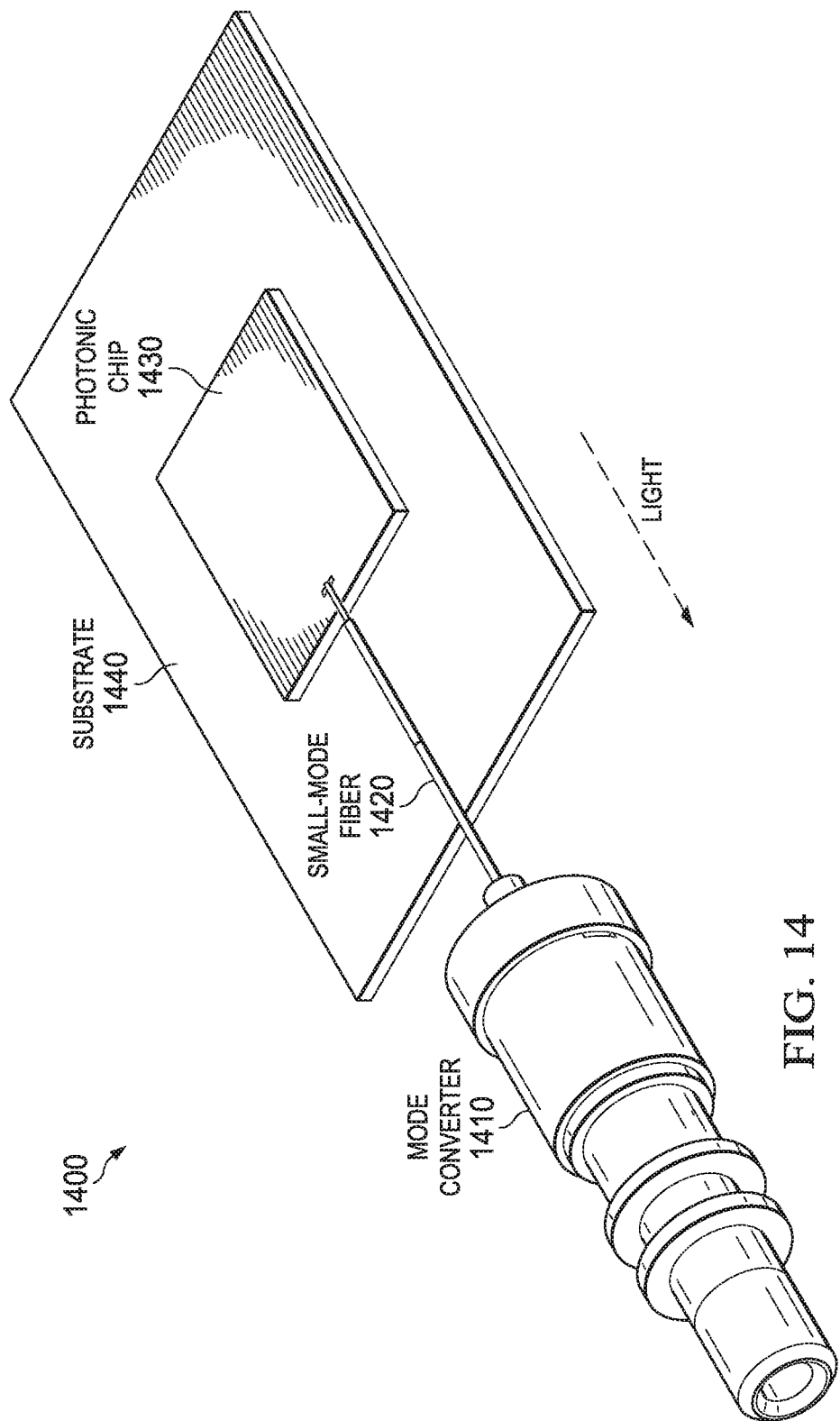
FIG. 14 is a schematic diagram of a mode converter system employing V-groove coupling according to an embodiment of the disclosure.

FIG. 14 is a schematic diagram of a mode converter system 1400 employing V-groove coupling according to an embodiment of the disclosure. The system 1400 comprises a mode converter 1410, a small-mode fiber 1420, a photonic chip 1430, and a substrate 1440. The mode converter 1410 is one of the mode converters 400, 1000, 1200. The small-mode fiber 1420 is one of the small-mode fibers 460, 1070, 1260 corresponding to the mode converters 400, 1000, 1200, respectively.

The photonic chip 1430 comprises silicon and a waveguide that is internal and therefore not shown. The substrate 1440 comprises silicon, ceramic, or another suitable material. The substrate 1440 provides a support for the photonic chip 1430 and may provide a support for additional components that are not shown. Those components may be, for instance, electrical components. In operation, a light enters the waveguide at some point within the photonic chip 1430, couples to the small-mode fiber 1420, travels through the mode converter 1410, converts to a larger mode within the mode converter 1410, and exits out the mode converter 1410 into an external large-mode fiber plugged into the mode converter 1410.

Figure 15A:
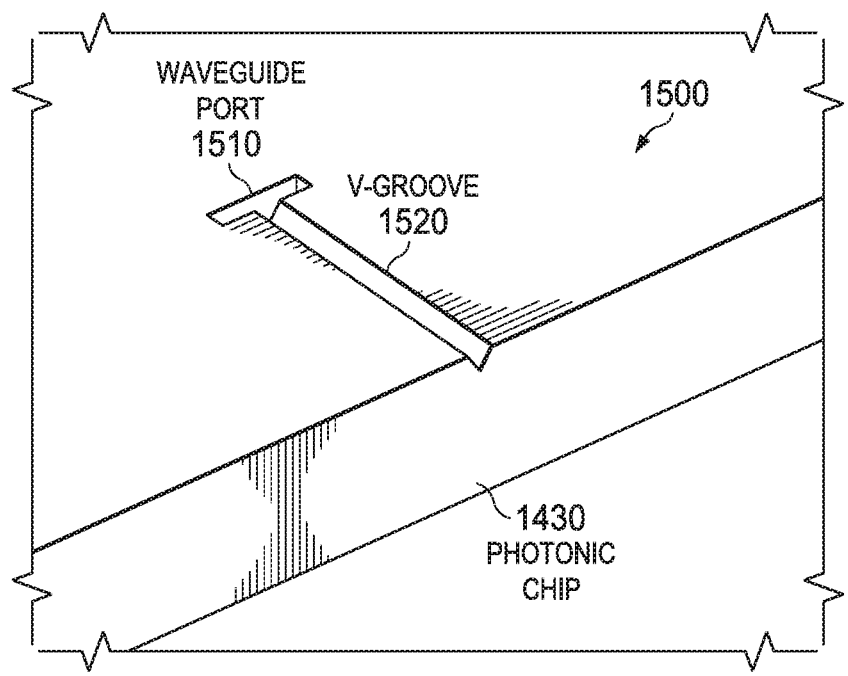
FIG. 15A is a first enlarged view of the photonic chip in FIG. 14 according to an embodiment of the disclosure.
Figure 15B:
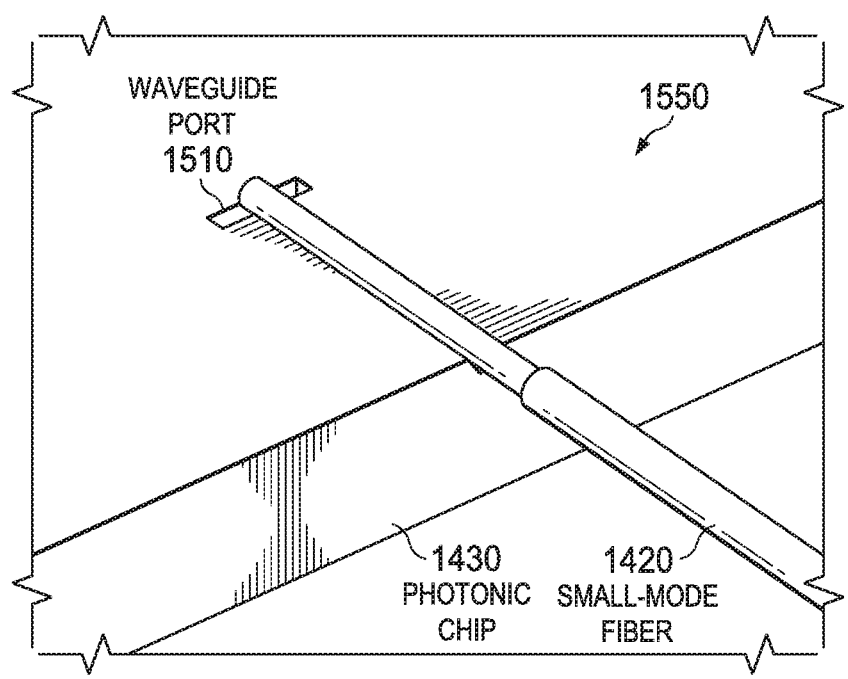
FIG. 15B is a second enlarged view of the photonic chip in FIG. 14 according to an embodiment of the disclosure.

FIG. 15A is a first enlarged view 1500 of the photonic chip 1430 in FIG. 14 according to an embodiment of the disclosure. FIG. 15A shows that the photonic chip 1430 comprises a waveguide port 1510 and a V-groove 1520. FIG. 15B is a second enlarged view 1550 of the photonic chip 1430 in FIG. 14 according to an embodiment of the disclosure. FIG. 15B shows that the small-mode fiber 1420 is bonded into the V-groove 1520, which is covered by the small-mode fiber 1420. The small-mode fiber 1420 is shown as comprising a circumferential line, which indicates an interface between an external buffer layer and a cladding layer of the small-mode fiber 1420.

Light from the waveguide port 1510 couples to the waveguide within the photonic chip 1430. The V-groove 1520 is wet etched into the photonic chip 1430. The small-mode fiber 1420 slides into the V-groove 1520, and the V-groove 1520 holds the small-mode fiber 1420 into place. The small-mode fiber 1420 may be bonded into the V-groove 1520 using an adhesive. The adhesive may be an optical epoxy that allows light to pass through. The small-mode fiber 1420 couples light from the waveguide within the photonic chip 1430 to the mode converter 1410.

Figure 16:
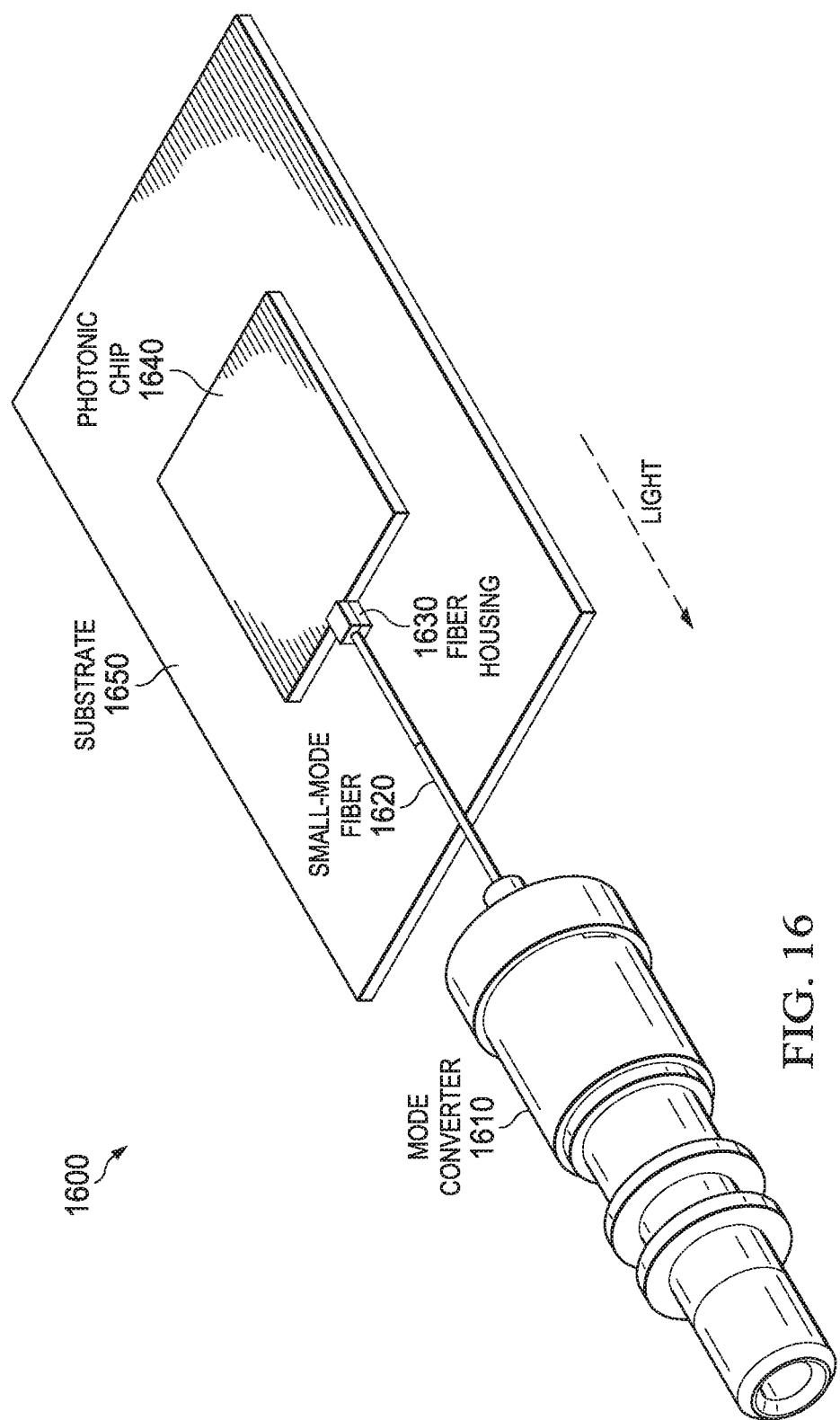
FIG. 16 is a schematic diagram of a mode converter system employing butt coupling according to an embodiment of the disclosure.

FIG. 16 is a schematic diagram of a mode converter system 1600 employing butt coupling according to an embodiment of the disclosure. The system 1600 comprises a mode converter 1610, a small-mode fiber 1620, a fiber housing 1630, a photonic chip 1640, and a substrate 1650. The mode converter 1610 is one of the mode converters 400, 1000, 1200. The small-mode fiber 1620 is one of the small-mode fibers 460, 1070, 1260 corresponding to the mode converters 400, 1000, 1200, respectively. The system 1600 is similar to the system 1400. However, instead of employing the V-groove 1520 for coupling, the system 1600 employs butt coupling so that no V-groove is needed.

The small-mode fiber 1620 comprises a polished tip. The polished tip is bonded in the fiber housing 1630 using an adhesive. The polished tip is also bonded, using an adhesive, to an edge of the photonic chip 1640 where a waveguide of the photonic chip 1640 ends. This bonding of the polished tip to the edge of the photonic chip 1640 is referred to as butt coupling, or edge coupling. The polished tip may be polished at an angle to reduce light reflection at the surfaces of the photonic chip 1640. The angle may be 4-8°. The fiber housing 1630 comprises glass or silicon.

Figure 17:
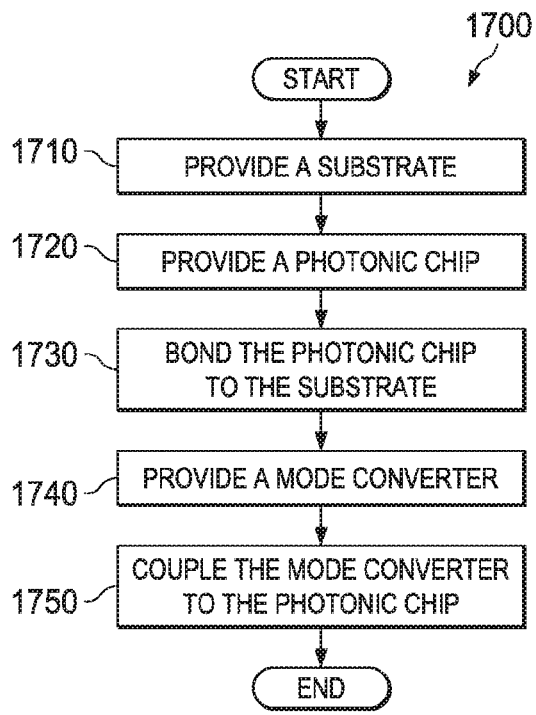
FIG. 17 is a flowchart illustrating a method of manufacturing a mode converter system.

FIG. 17 is a flowchart illustrating a method 1700 of manufacturing a mode converter system. The mode converter system 1400 is, for instance, the system 1400 or 1600. At step 1710, a substrate is provided. For instance, the substrate 1440 or 1650 is provided. At step 1720, a photonic chip is provided. For instance, the photonic chip 1430 or 1640 is provided. At step 1730, the photonic chip is bonded to the substrate. At step 1740, a mode converter is provided. For instance, the mode converter 1410 or 1610 is provided. Finally, at step 1750, the mode converter is coupled to the photonic chip. For instance, the mode converter is coupled to the photonic chip either via a waveguide port and a V-groove or butt coupling as describe above for FIGS. 14 and 16, respectively.

Figure 18:
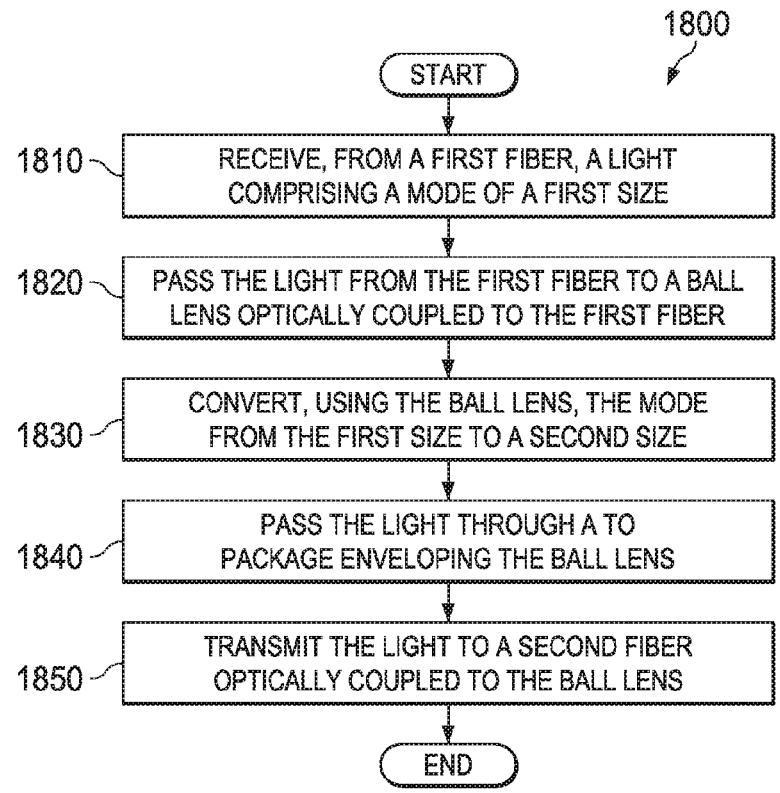
FIG. 18 is a flowchart illustrating a method of converting a mode of light according to an embodiment of the disclosure.

FIG. 18 is a flowchart illustrating a method 1800 of converting a mode of light according to an embodiment of the disclosure. The systems 1400, 1600 implement the method 1800 upon transmitting or receiving a light. At step 1810, a light is received from a first fiber. For instance, a light is received from the small-mode fiber 1420 or the small-mode fiber 1620. The light comprises a mode of a first size. At step 1820, the light is passed from the first fiber to a ball lens optically coupled to the first fiber. For instance, the light is passed from the small-mode fiber 1420 or 1620 to the ball lens 610, 1040, or 1310. At step 1830, the mode is converted from the first size to a second size using the ball lens. At step 1840, the light is passed through a TO package enveloping the ball lens. For instance, the light is passed through a TO package in the mode converter 1410 or 1610. Step 1840 may occur before, after, and as part of step 1830. Finally, at step 1850, the light is transmitted to a second fiber optically coupled to the ball lens. For instance, the light is transmitted to an external large-mode fiber that snaps into the mode converter 1410 or 1610.

The use of the term "about" means a range including ±10% of the subsequent number, unless otherwise stated. While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
    a transistor outline (TO) package comprising:
        a TO can holder, and
        a TO can at least partially embedded within the TO can holder;
    a mode converter coupled to the TO can;
    a ferrule holder coupled to the TO can holder;
    a first ferrule at least partially embedded within the ferrule holder;
    a small-mode fiber at least partially embedded within the first ferrule and providing a first air gap between the small-mode fiber and the mode converter; a second ferrule; and
    a large-mode fiber fully embedded within the second ferrule and providing a second air gap between the large-mode fiber and the mode converter.

2. The apparatus of claim 1, wherein the mode converter is a ball lens.

3. The apparatus of claim 2, wherein the ball lens comprises N-BK7 glass or sapphire glass.

4. The apparatus of claim 3, wherein the ball lens is bonded to a top of the TO can with glass frit.

5. The apparatus of claim 2, wherein the ball lens comprises a diameter between 1 and 2 millimeters.

6. The apparatus of claim 2, wherein the ball lens comprises an index of refraction between 1.7 and 1.9.

7. The apparatus of claim 2, wherein the ball lens comprises an effective focal length between 0.3 and 3 millimeters.

8. The apparatus of claim 1, further comprising:
    a receptacle holder bonded to the TO can holder; and
    a fiber receptacle at least partially embedded within the receptacle holder.

9. The apparatus of claim 8, wherein the receptacle holder comprises stainless steel, and wherein the fiber receptacle comprises a stainless steel exterior and an interior comprising the second ferrule.

10. The apparatus of claim 9, wherein the receptacle holder is laser welded to the TO can holder, and wherein the fiber receptacle is bonded to the receptacle holder.

11. The apparatus of claim 1, wherein the ferrule holder comprises stainless steel, and wherein the first ferrule comprises a zirconia exterior.

12. The apparatus of claim 11, wherein the ferrule holder is laser welded or resistance welded to the TO can holder, and wherein first ferrule is bonded to the ferrule holder.

13. The apparatus of claim 1, wherein the mode converter is an aspherical lens.

14. The apparatus of claim 1, wherein the apparatus encloses the first air gap and the second air gap so that the TO can provides a closed optical path.

15. The apparatus of claim 1, wherein the small-mode fiber comprises a relatively smaller mode size compared to the large-mode fiber.

16. The apparatus of claim 1, wherein the small-mode fiber comprises:
    a core comprising a diameter between 2 micrometers and 4 micrometers and configured to communicate light; and
    a cladding configured to protect the core.

17. The apparatus of claim 1, wherein the large-mode fiber comprises a mode, and wherein the mode comprises a diameter between 8 micrometers and 10 micrometers.

18. The apparatus of claim 1, wherein the first ferrule comprises:
    a first tip polished at a first angle configured to reduce light reflection at surfaces of the first ferrule; and
    a second tip polished at a second angle configured to reduce light reflection at the surfaces.

19. The apparatus of claim 18, wherein the first angle, the second angle, or both the first angle and the second angle are between 4 degrees 8 degrees.

20. The apparatus of claim 1, wherein the first ferrule is mechanically press fitted into the ferrule holder.

\* \* \* \* \*

UNITED STATES PATENT AND TRADEMARK OFFICE
CERTIFICATE OF CORRECTION

PATENT NO. : 9,874,699 B2
APPLICATION NO. : 15/058753
DATED : January 23, 2018
INVENTOR(S) : Rongsheng Miao et al.

Page 1 of 1

It is certified that error appears in the above-identified patent and that said Letters Patent is hereby corrected as shown below:

In the Claims

Column 10, Lines 3-4, Claim 5 should read:
5. The apparatus of claim 2, wherein the ball lens comprises a diameter between 1 millimeter and 2 millimeters.

Column 10, Lines 7-9, Claim 7 should read:
7. The apparatus of claim 2, wherein the ball lens comprises an effective focal length between 0.3 millimeters and 3 millimeters.

Column 10, Lines 49-51, Claim 19 should read:
19. The apparatus of claim 18, wherein the first angle, the second angle, or both the first angle and the second angle are between 4 degrees and 8 degrees.

Signed and Sealed this
Seventeenth Day of April, 2018

Andrei Iancu
*Director of the United States Patent and Trademark Office*